United States Patent
Razoumov et al.

(10) Patent No.: US 6,711,208 B2
(45) Date of Patent: Mar. 23, 2004

(54) ESTIMATION OF TRAFFIC-TO-PILOT RATIOS

(75) Inventors: Leonid Razoumov, San Diego, CA (US); Stein A. Lundby, Solana Beach, CA (US); Jack M. Holtzman, San Diego, CA (US); Edward G. Tiedemann, Jr., Concord, MA (US); Joseph P. Odenwalder, Rancho Santa Fe, CA (US)

(73) Assignee: Qualcomm, Incorporated, San Diego, CA (US)

( * ) Notice: Subject to any disclaimer, the term of this patent is extended or adjusted under 35 U.S.C. 154(b) by 458 days.

(21) Appl. No.: 09/730,146

(22) Filed: Dec. 4, 2000

(65) Prior Publication Data

US 2002/0067774 A1 Jun. 6, 2002

(51) Int. Cl.$^7$ ................................. H04B 17/00
(52) U.S. Cl. ................. 375/224; 370/252; 370/332; 455/522
(58) Field of Search ................. 375/130, 224, 375/259; 370/252, 332; 455/226.1, 423, 522

(56) References Cited

U.S. PATENT DOCUMENTS

| | | |
|---|---|---|
| 4,901,307 A | 2/1990 | Gilhousen et al. |
| 5,056,109 A | 10/1991 | Gilhousen et al. |
| 5,103,459 A | 4/1992 | Gilhousen et al. |
| 5,267,261 A | 11/1993 | Blakeney, II et al. |
| 5,504,773 A | 4/1996 | Padovani et al. |
| 5,548,808 A * | 8/1996 | Bruckert et al. ............ 455/442 |
| 5,771,451 A * | 6/1998 | Takai et al. ................ 455/442 |
| 5,933,462 A | 8/1999 | Viterbi et al. |
| 6,434,366 B1 * | 8/2002 | Harrison et al. ............. 455/69 |

OTHER PUBLICATIONS

Sarkar et al. "CDMA2000 Reverse Link: Design and System Performance", *IEEE Vehicular Technology Conference, New York*. pp. 2713–2719, Sep. 2000.

* cited by examiner

*Primary Examiner*—Amanda T. Le
(74) *Attorney, Agent, or Firm*—Philip R. Wadsworth; Kent D. Baker; Kyong H. Macek

(57) ABSTRACT

A method for coherent estimation of the traffic-to-pilot energy ratio is presented. A received preamble is decoded, and then re-encoded. The received preamble is then multiplied by the re-encoded preamble. The results are summed, squared, and then divided by a pilot energy value. In another method, a message carrying energy information can be inserted between a subpacket preamble and a subpacket.

10 Claims, 4 Drawing Sheets

ESTIMATION OF TRAFFIC-TO-PILOT RATIOS

BACKGROUND

I. Field

The present invention pertains generally to the field of wireless communication systems. More particularly, the present invention pertains to improved methods and apparatus for estimating traffic-to-pilot ratios in a packet-based communication system.

II. Background

The field of wireless communications has many applications including, e.g., cordless telephones, paging, wireless local loops, personal digital assistants (PDAs), Internet telephony, and satellite communication systems. A particularly important application is cellular telephone systems for mobile subscribers. (As used herein, the term "cellular" systems encompasses both cellular and personal communications services (PCS) frequencies.) Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). In particular, IS-95 and its derivatives, IS-95A, IS-95B, ANSI J-STD-008 (often referred to collectively herein as IS-95), and proposed high-data-rate systems for data, etc. are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. Exemplary cellular telephone systems configured substantially in accordance with the use of the IS-95 standard are described in U.S. Pat. Nos. 5,103,459 and 4,901,307, which are assigned to the assignee of the present invention and fully incorporated herein by reference. In CDMA systems, over-the-air power control is a vital issue. An exemplary method of power control in a CDMA system is described in U.S. Pat. No. 5,056,109, which is assigned to the assignee of the present invention and fully incorporated herein by reference.

A primary benefit of using a CDMA over-the-air interface is that communications are conducted over the same radio frequency (RF) band. For example, each remote subscriber unit (e.g., a cellular telephone, personal digital assistant (PDA), laptop connected to a cellular telephone, hands-free car kit, etc.) in a given cellular telephone system can communicate with the same base station by transmitting a reverse-link signal over the same 1.25 MHz of RF spectrum. Similarly, each base station in such a system can communicate with remote units by transmitting a forward-link signal over another 1.25 MHz of RF spectrum. Transmitting signals over the same RF spectrum provides various benefits including, e.g., an increase in the frequency reuse of a cellular telephone system and the ability to conduct soft handoff between two or more base stations. Increased frequency reuse allows a greater number of calls to be conducted over a given amount of spectrum. Soft handoff is a robust method of transitioning a remote station from the coverage area of two or more base stations that involves simultaneously interfacing with two base stations. In contrast, hard handoff involves terminating the interface with a first base station before establishing the interface with a second base station. An exemplary method of performing soft handoff is described in U.S. Pat. No. 5,267,261, which is assigned to the assignee of the present invention and fully incorporated herein by reference.

In conventional cellular telephone systems, a public switched telephone network (PSTN) (typically a telephone company) and a mobile switching center (MSC) communicate with one or more base station controllers (BSCs) over standardized E1 and/or T1 telephone lines (hereinafter referred to as E1/T1 lines). The BSCs communicate with base station transceiver subsystems (BTSs) (also referred to as either base stations or cell sites), and with each other, over a backhaul comprising E1/T1 lines. The BTSs communicate with remote units via RF signals sent over the air.

To provide increased capacity, the International Telecommunications Union recently requested the submission of proposed methods for providing high-rate data and high-quality speech services over wireless communication channels. The submissions describe so-called "third generation," or "3G," systems. An exemplary proposal, the cdma2000 ITU-R Radio Transmission Technology (RTT) Candidate Submission (referred to herein as cdma2000), was issued by the TIA. The standard for cdma2000 is given in draft versions of IS-2000 and has been approved by the TIA. The cdma2000 proposal is compatible with IS-95 systems in many ways. Another CDMA standard is the W-CDMA standard, as embodied in $3^{rd}$ Generation Partnership Project "3GPP", Document Nos. 3G TS 25.211, 3G TS 25.212, 3G TS 25.213, and 3G TS 25.214.

Given the growing demand for wireless data applications, the need for very efficient wireless data communication systems has become increasingly significant. The IS-95, cdma2000, and WCDMA standards are capable of transmitting both data traffic and voice traffic over the forward and reverse links. A method for transmitting data traffic in code channel frames of fixed size is described in detail in U.S. Pat. No. 5,504,773, entitled "METHOD AND APPARATUS FOR THE FORMATTING OF DATA FOR TRANSMISSION," assigned to the assignee of the present invention and incorporated by reference herein.

A significant difference between voice traffic services and data traffic services is the fact that the former imposes stringent maximum delay requirements. Typically, the overall one-way delay of speech traffic frames must be less than 100 msec. In contrast, the delay of data traffic frames can be permitted to vary in order to optimize the efficiency of the data communication system. Specifically, more efficient error correcting coding techniques, which require significantly larger delays than those that can be tolerated by voice traffic services, can be utilized. An exemplary efficient coding scheme for data is disclosed in U.S. patent application Ser. No. 08/743,688, entitled "SOFT DECISION OUTPUT DECODER FOR DECODING CONVOLUTIONALLY ENCODED CODEWORDS," filed Nov. 6, 1996, assigned to the assignee of the present invention and incorporated by reference herein.

Another significant difference between voice traffic and data traffic is that voice traffic requires a fixed and common grade of service (GOS) for all users. Typically, for digital systems providing voice traffic services, this translates into a fixed and equal transmission rate for all users and a maximum tolerable error rate for the speech traffic frames. In contrast, because of the availability of retransmission protocols for data traffic services, the GOS can be different from user to user and can be varied in order to increase the overall efficiency of the data communication system. The GOS of a data traffic communication system is typically defined as the total delay incurred in the transfer of a predetermined amount of data.

Transmission of digital data is inherently prone to interference, which may introduce errors into the transmitted data. Error detection schemes have been suggested to determine as reliably as possible whether errors have been introduced into the transmitted data. For example, it is common to transmit data in packets and add to each packet a cyclic redundancy check (CRC) field, for example of a length of sixteen bits, which carries a checksum of the data of the packet. When a receiver receives the data, the receiver calculates the same checksum on the received data and verifies whether the result of the calculation is identical to the checksum in the CRC field.

Convolutional codes have been introduced to allow receivers of digital data to correctly determine the transmitted data even when errors may have occurred during transmission. The convolutional codes introduce redundancy into the transmitted data and pack the transmitted data into packets in which the value of each bit is dependent on earlier bits in the sequence. Thus, when errors occur, the receiver can still deduce the original data by tracing back possible sequences in the received data.

To further improve the performance of a transmission channel, some coding schemes include interleavers, which permute the order of the bits in the packet during coding. Thus, when interference destroys some adjacent bits during transmission, the effect of the interference is spread out over the entire original packet and can more readily be overcome by the decoding process. Other improvements may include multiple-component codes that encode the packet more than once, in parallel or in series. For example, it is known in the art to employ an error correction method that uses at least two convolutional coders in parallel. Such parallel encoding is commonly referred to as turbo coding.

For multiple-component codes, optimal decoding is often a very complex task, and may require large periods of time not usually available for on-line decoding. Iterative decoding techniques have been developed to overcome this problem. Rather than determining immediately whether received bits are zero or one, the receiver assigns each bit a value on a multilevel scale representative of the probability that the bit is one.

Data represented on the multilevel scale is referred to as "soft data," and iterative decoding is usually soft-in/soft-out, i.e., the decoding process receives a sequence of inputs corresponding to probabilities for the bit values and provides as output corrected probabilities, taking into account constraints of the code. Generally, a decoder that performs iterative decoding uses soft data from former iterations to decode the soft data read by the receiver. During iterative decoding of multiple-component codes, the decoder uses results from decoding of one code to improve the decoding of the second code. When parallel encoders are used, as in turbo coding, two corresponding decoders may conveniently be used in parallel for this purpose. Such iterative decoding is carried out for a plurality of iterations until it is believed that the soft data closely represents the transmitted data. Those bits that have a probability indicating that they are closer to one are assigned binary zero, and the remaining bits are assigned binary one.

"Turbo coding" represents an important advancement in the area of forward error correction (FEC). There are many variants of turbo coding, but most types of turbo coding use multiple encoding steps separated by interleaving steps combined with the use of iterative decoding. This combination provides previously unavailable performance with respect to noise tolerance in a communications system. Namely, turbo coding allows communications at levels of energy-per-bit per noise power spectral density ($E_b/N_0$) that were previously unacceptable using the existing forward error correction techniques.

Many communication systems use forward error correction techniques and therefore would benefit from the use of turbo coding. Hence, it would be advantageous to further enhance the performance of turbo decoders in wireless communication systems. One enhancement to the performance of turbo decoders would be accurate and timely traffic-to-pilot energy ratio information. Such information is part of the soft data that aids the iterative decoding process. Hence, there is a need for fast estimation of traffic-to-pilot ratios. It should be obvious to one of skill in the art that in addition to use in turbo decoding, other techniques in wireless communications could benefit from a method for fast estimation of traffic channel energy.

SUMMARY

A novel and nonbovious method and apparatus for performing coherent estimation is presented, the method comprising: receiving a first symbol sequence on a traffic channel; decoding the first symbol sequence to determine a data payload; encoding the data payload to form a second symbol sequence; multiplying the first symbol sequence with the second symbol sequence to form a third symbol sequence; summing each element of the third symbol sequence to determine a traffic energy value; and dividing the traffic energy value by a pilot energy value.

In another aspect, a method for improving the performance of a turbo decoder is presented, the method comprising: determining an energy value for a transmission from a first station to a second station; forming a message carrying the energy value; and transmitting the message to the second station.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

Figure 1:
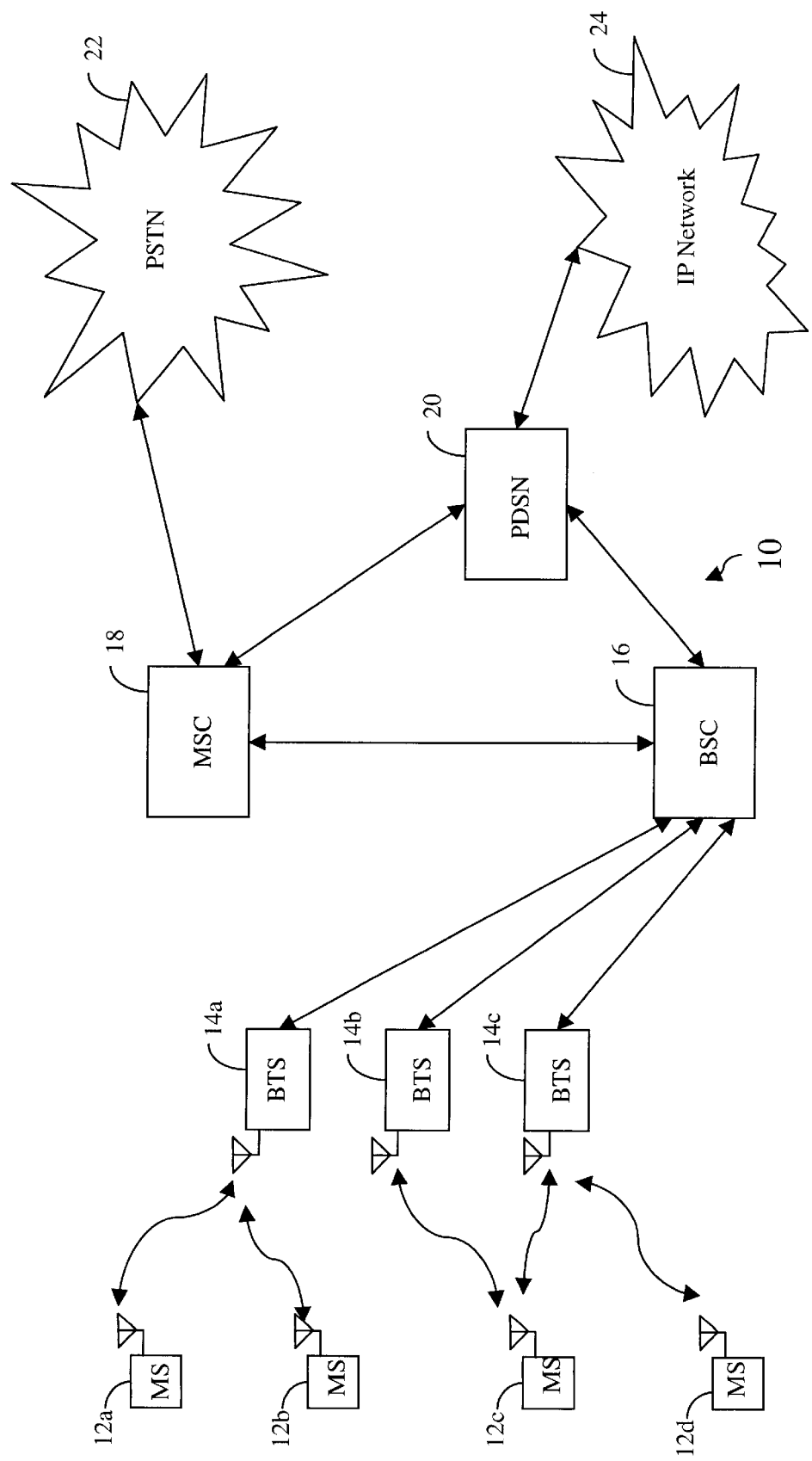
FIG. 1 is a diagram of an exemplary data communication system.

As illustrated in FIG. 1, a wireless communication network 10 generally includes a plurality of mobile stations or remote subscriber units 12a–12d, a plurality of base stations 14a–14c, a base station controller (BSC) or packet control function 16, a mobile station controller (MSC) or switch 18, a packet data serving node (PDSN) or internetworking function (IWF) 20, a public switched telephone network (PSTN) 22 (typically a telephone company), and an Internet Protocol (IP) network 24 (typically the Internet). For purposes of simplicity, four remote stations 12a–12d, three base stations 14a–14c, one BSC 16, one MSC 18, and one PDSN 20 are shown. It would be understood by those skilled in the art that there could be any number of remote stations 12, base stations 14, BSCs 16, MSCs 18, and PDSNs 20.

In one embodiment, the wireless communication network 10 is a packet data services network. The remote stations 12a–12d may be cellular telephones, cellular telephones connected to laptop computers running IP-based, Web-browser applications, cellular telephones with associated hands-free car kits, or PDAs running IP-based, Web-browser applications. The remote stations 12a–12d may advantageously be configured to perform one or more wireless packet data protocols such as described in, e.g., the EIA/TIA/IS-707 standard. In a particular embodiment, the remote stations 12a–12d generate IP packets destined for the IP network 24 and encapsulate the IP packets into frames using a point-to-point protocol (PPP).

In one embodiment, the IP network 24 is coupled to the PDSN 20, the PDSN 20 is coupled to the MSC 18, the MSC is coupled to the BSC 16 and the PSTN 22, and the BSC 16 is coupled to the base stations 14a–14c via wirelines configured for transmission of voice and/or data packets in accordance with any of several known protocols including, e.g., E1, T1, Asynchronous Transfer Mode (ATM), IP, PPP, Frame Relay, HDSL, ADSL, or xDSL. In an alternate embodiment, the BSC 16 is coupled directly to the PDSN 20, and the MSC 18 is not coupled to the PDSN 20. In one embodiment the remote stations 12a–12d communicate with the base stations 14a–14c over an RF interface defined in $3^{rd}$ *Generation Partnership Project 2* "*3GPP2*", "Physical Layer Standard for cdma2000 Spread Spectrum Systems," 3GPP2 Document No. C.P0002-A, TIA PN-4694, to be published as TIA/EIA/IS-2000-2-A, (Draft, edit version 30) (Nov. 19, 1999), which is fully incorporated herein by reference.

During typical operation of the wireless communication network 10, the base stations 14a–14c receive and demodulate sets of reverse-link signals from various remote stations 12a–12d engaged in telephone calls, Web browsing, or other data communications. Each reverse-link signal received by a given base station 14a–14c is processed within that base station 14a–14c. Each base station 14a–14c may communicate with a plurality of remote stations 12a–12d by modulating and transmitting sets of forward-link signals to the remote stations 12a–12d. For example, the base station 14a communicates with first and second remote stations 12a, 12b simultaneously, and the base station 14c communicates with third and fourth remote stations 12c, 12d simultaneously. The resulting packets are forwarded to the BSC 16, which provides call resource allocation and mobility management functionality including the orchestration of soft handoffs of a call for a particular remote station 12a–12d from one base station 14a–14c to another base station 14a–14c. For example, a remote station 12c is communicating with two base stations 14b, 14c simultaneously. Eventually, when the remote station 12c moves far enough away from one of the base stations 14c, the call will be handed off to the other base station 14b.

If the transmission is a conventional telephone call, the BSC 16 will route the received data to the MSC 18, which provides additional routing services for interface with the PSTN 22. If the transmission is a packet-based transmission such as a data call destined for the IP network 24, the MSC 18 will route the data packets to the PDSN 20, which will send the packets to the IP network 24. Alternatively, the BSC 16 will route the packets directly to the PDSN 20, which sends the packets to the IP network 24.

Reverse channels are transmissions from remote stations 12a–12d to base stations 14a–14c. Performance of reverse link transmissions can be measured as a ratio between the energy levels of the pilot channel and other reverse traffic channels. A pilot channel accompanies the traffic channels in order to provide coherent demodulation of the received traffic channels. In the cdma2000 system, the reverse traffic channels can comprise multiple channels, including but not limited to an access channel, an enhanced access channel, a reverse common control channel, a reverse dedicated control channel, a reverse fundamental channel, a reverse supplemental channel, and a reverse supplemental code channel, as specified by radio configurations of each individual subscriber network using cdma2000. The forward link channels can also comprise multiple channels, including but not limited to, pilot channels, synchronization channels, paging channels, broadcast channels, assignment channels, common power control channels, common control channels, dedicated control channels, fundamental channels, supplemental channels, and supplemental code channels.

The pilot channel contains no data modulation and is characterized as an unmodulated spread spectrum signal that all remote stations within the range of a base station use for acquisition or tracking purposes. The Walsh "zero" ($W_0$) sequence, which consists of all zeroes, is used so that there is no modulation of the pilot signal. The pilot signal comprises a short pseudorandom noise (PN) sequence, which has the characteristic of being uncorrelated with time-shifted versions of itself. Hence, the generation of identifying information is possible by offsets to the PN sequence.

In a wireless communication system capable of transporting data traffic, the data traffic is typically transported in packets over the air. For illustrative purposes only, the nomenclature of the cdma2000 system is used herein. Such use is not intended to limit the implementation of the invention to cdma2000 systems. In a cdma2000 system, a packet is transported in units of "subpackets," which occupy slot times. Slots sizes have been designated as 1.25 ms, but it should be understood that slot sizes may vary in the embodiments described herein without affecting the scope of the embodiments. Data payload is redundantly packed into at least one subpacket for transmission. If such a redundant packing occurs, power consumption and interference to other remote stations may be reduced through the process of soft combining, wherein one corrupted subpacket is combined with another corrupted subpacket. In this manner, the transmission of repetitious and redundant subpackets can produce optimal data transmission rates.

For data traffic transmissions, a preamble can be attached to the first transmitted subpacket, wherein the preamble carries information identifying the identity of the target destination of the data payload, the transmission rate of the subpacket, and the number of subpackets used to carry the full amount of data payload. The timing of the arrival of subpackets, i.e., the periodic intervals at which retransmissions are scheduled to arrive, is usually a predefined system parameter, but if a system does not have such a system parameter, timing information may also be included in the preamble. Other information, such as the Radio Link Protocol (RLP) sequence numbers of the data packet, can also be included. Since the target destination is on notice that future transmissions will arrive at specific times, such future transmissions need not include preamble bits. However, in those instances in which transmissions are irregular, such as in channel-sensitive transmission schemes, a preamble must be attached to every data subpacket transmission.

Figure 2:
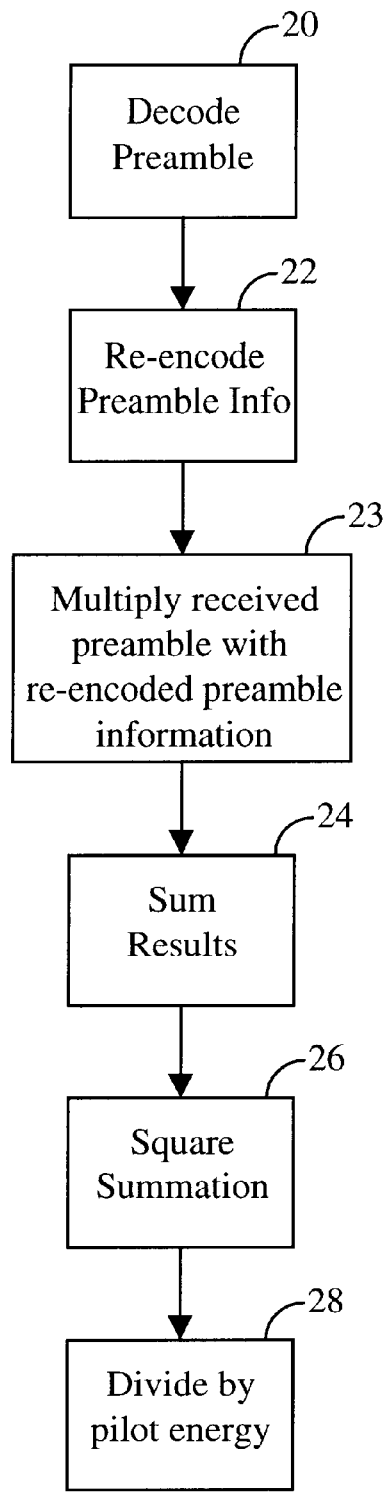
FIG. 2 is a flow chart of algorithm steps in accordance with an exemplary embodiment.

In an exemplary embodiment, an estimate of the ratio of the traffic energy to the pilot energy can be determined by using the preamble information of a data subpacket. In this embodiment, decoded preamble symbols are used to coherently estimate the traffic-to-pilot ratio. FIG. 2 illustrates a flow chart in accordance with this embodiment. At step 20, received preamble symbols are decoded at a decoder (not shown). If received preamble symbols cannot be decoded correctly, then the received subpacket is discarded and new preamble symbols from another subpacket are used. In an exemplary CDMA system, the preamble and subpacket are discarded if the preamble cannot be decoded within a FER range of approximately 0.01 to 0.1 of a percent, or less. At step 22, decoded preamble information is encoded at a coder (not shown) to regenerate new preamble symbols. At step 23, the re-encoded preamble symbols are multiplied by the received preamble symbols at a multiplication element (not shown). At step 24, the results of the multiplication are summed at a summing element (not shown). At step 26, the summed value is squared, yielding a traffic energy value. At step 28, the traffic energy value is divided by a pilot energy value.

For example, suppose the preamble symbols (1, −, 1, −1) are received. The information payload is derived after decoding. Examples of simple coding techniques commonly used in CDMA systems on preambles are block codes and cyclic redundancy check (CRC) bits. Other coding techniques can also be used without affecting the scope of this embodiment. The preamble information is then encoded in the same manner as the originally received preamble symbols to arrive at (1, −, 1, −1). The received preamble symbols and the re-encoded preamble symbols are multiplied, yielding the sequence (1, 1, 1, 1). The results are summed, i.e., 1+1+1+1=4. The sum is then squared to result in the value of 16. This is a gain of 6 dB over a noncoherent estimate of the same sequence, in which the energy of the traffic symbols is determined without knowledge of symbol values. In a noncoherent estimate, the bits of the received symbols are individually squared to eliminate negative terms, and then added together to form an energy value. In this instance, the end result of a noncoherent estimation would be $(1)^2+(-1)^2+(1)^2+(-1)^2=4$.

The above embodiments can be implemented in any communication system that uses a preamble or a header to accompany packetized data and a pilot channel. In the WCDMA system, preamble information is carried on a channel separate from the channel carrying data traffic. Nevertheless, the above embodiment may still be implemented to perform coherent estimation of the traffic-to-pilot ratio. The above embodiment is advantageous in that coherent estimation provides a gain of approximately 20 dB for a preamble comprising 96 symbols, which is the case in a cdma2000 system.

Figure 3:
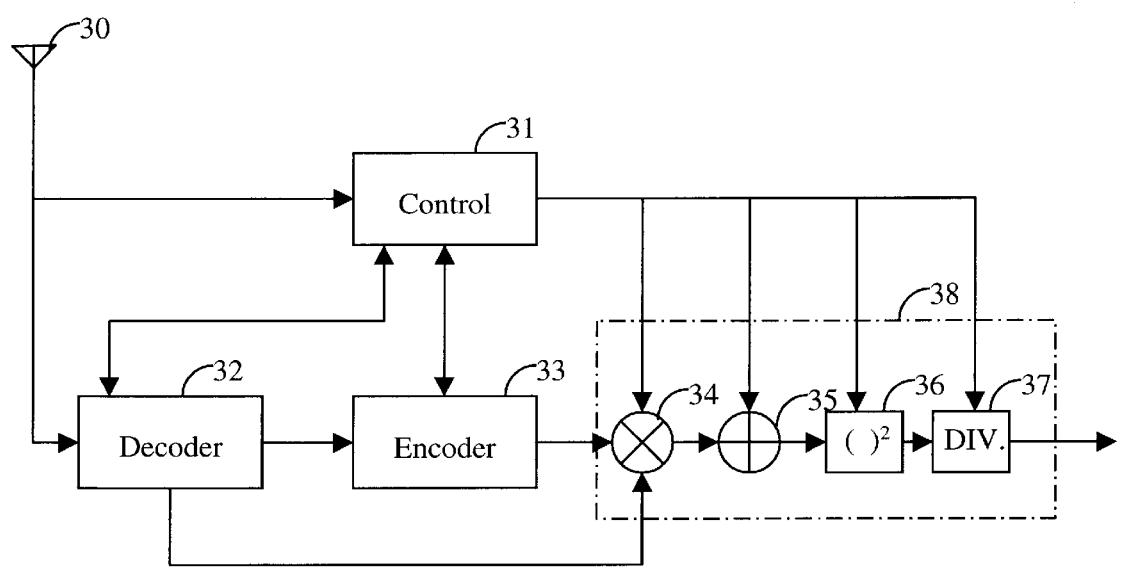
FIG. 3 is a diagram of an apparatus implementing an exemplary embodiment.

FIG. 3 is a block diagram of an apparatus configured to perform the method steps above. Receiver 30 receives data subpacket with accompanying preamble. Control processor 31 routes received preamble to decoder 32. Decoded preamble information is routed by control processor 31 to encoder 33, where preamble information is re-encoded. Received preamble and re-encoded preamble are multiplied together by a multiplier 34. Multiplication result is summed by summer 35. Summation from summer 35 is squared at squaring element 36. Result from squaring element 36 is divided by a pilot energy value at division element 37, where the pilot energy value is provided by control processor 31. Alternatively, a generic calculation element 38 can encompass the functional blocks 34, 35, 36, and 37.

In another exemplary embodiment, the determination of the traffic energy to pilot energy ratio is made directly by the transmitting party and the information is included in a message. In one example, the message bits can be included as part of a preamble. In another example, the message bits can be included as a part of the data subpacket. Alternatively, the message can be transported as a separate payload. The energy ratio can be stated explicitly in the message, or the message may carry an index value for an energy value in a look-up table.

If the message is included in the data subpacket, it would be desirable to position the message at the front of the data subpacket, which would allow the recipient to quickly process the traffic-to-pilot ratio information for use on the data subpacket in the turbo decoder. Hence, the message bits would be encoded using a simple, easily processed code, such as, e.g., a block code.

Figure 4:
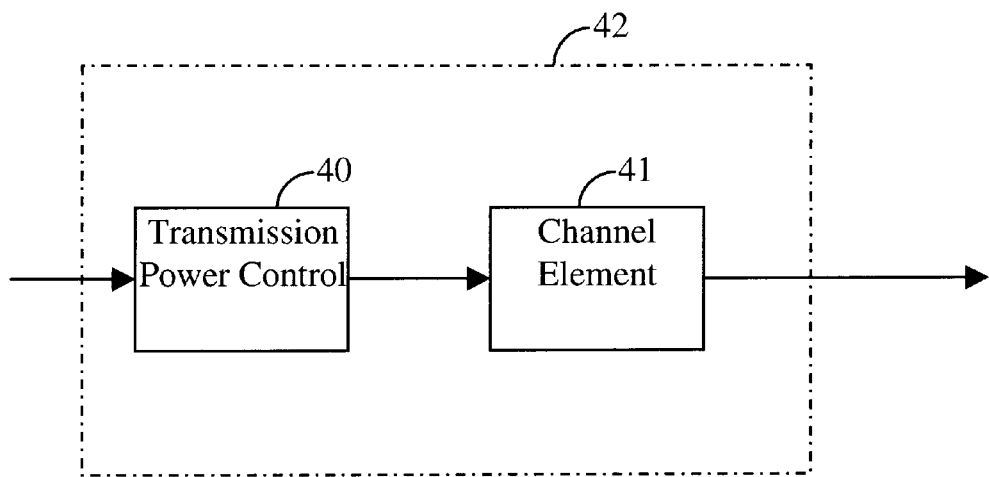
FIG. 4 is a diagram of an apparatus implementing another exemplary embodiment.

FIG. 4 is an apparatus that can perform the message generation described above. A transmission power control unit 40 determines the transmission power level and the transmission rate of a data packet. Accordingly, the data packet is repackaged into subpackets at a channel element 41. The transmission power control unit 40 generates a traffic-to-pilot ratio message that is appended to a data subpacket from the channel element 41. The transmission power control unit 40 also generates a preamble for attachment to the data subpacket. Alternatively, a processor 42 can be programmed to encompass the functions of the transmission power control unit 40 and the channel element 41.

It should be noted that the apparatus of FIG. 3 or FIG. 4 can be located at either a remote station or a base station, since some exemplary CDMA systems supply both a pilot channel and a traffic channel on the forward link and the reverse link.

Figure 5:
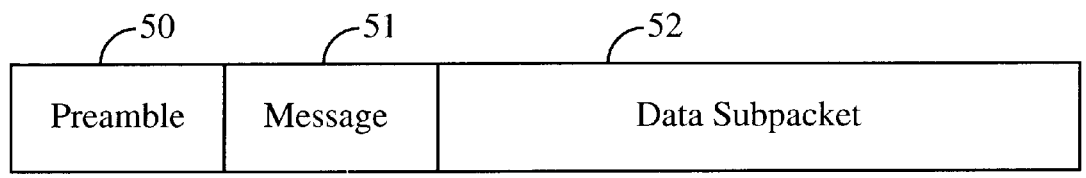
FIG. 5 illustrates fields in a frame structure in accordance with an exemplary embodiment.

FIG. 5 is an example of a channel frame wherein a preamble field 50 precedes an energy message field 51 that precedes a data subpacket field 52.

Thus, novel and improved methods and apparatus for estimating traffic-to-pilot ratios have been described. Those of skill in the art would understand that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof. The processor may advantageously be a microprocessor, but in the alternative, the processor may be any conventional processor, controller, microcontroller, or state machine. The software module could reside in RAM memory, flash memory, ROM memory, EPROM memory, EEPROM memory, registers, hard disk, a removable disk, a CD-ROM, or any other form of storage medium known in the art. Those of skill would further appreciate that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

We claim:

1. A coherent estimation method, comprising:

receiving a first symbol sequence on a traffic channel;

decoding the first symbol sequence to determine a data payload;

encoding the data payload to form a second symbol sequence;

multiplying the first symbol sequence with the second symbol sequence to form a third symbol sequence;

summing each element of the third symbol sequence to determine a traffic energy value; and dividing the traffic energy value by a pilot energy value.

2. The method of claim 1, wherein the first symbol sequence is a preamble sequence.

3. The method of claim 1, wherein the method is performed by a remote station.

4. The method of claim 1, wherein the method is performed by a base station.

5. The method of claim 1, wherein the decoding is performed by a block decoder.

6. An apparatus for coherently estimating a traffic-to-pilot ratio, comprising:

means for receiving a first symbol sequence on a traffic channel;

means for decoding the first symbol sequence to determine a data payload;

means for encoding the data payload to form a second symbol sequence;

means for multiplying the first symbol sequence with the second symbol sequence to form a third symbol sequence;

means for summing each element of the third symbol sequence to determine a traffic energy value; and means for dividing the traffic energy value by a pilot energy value.

7. An apparatus for coherently estimating a traffic-to-pilot ratio, comprising:

a receiver for receiving a preamble sequence;

a decoder for decoding the preamble sequence to determine a data payload;

an encoder for encoding the data payload; and a calculation element for multiplying the encoded data payload with the preamble sequence to form an intermediate sequence, for summing each component of the intermediate sequence to form an energy value, and for dividing the energy value by a pilot energy value, wherein the pilot energy value is determined from a pilot sequence.

8. The apparatus of claim 7, wherein the receiver is located at a remote station.

9. The apparatus of claim 7, wherein the receiver is located at a base station.

10. The apparatus of claim 7, wherein the decoder is a block decoder.

* * * * *